United States Patent
Iyoda

(10) Patent No.: US 7,853,381 B2
(45) Date of Patent: Dec. 14, 2010

(54) OCCUPANT PROTECTION DEVICE

(75) Inventor: Motomi Iyoda, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 603 days.

(21) Appl. No.: 11/793,236

(22) PCT Filed: Oct. 26, 2006

(86) PCT No.: PCT/JP2006/021419

§ 371 (c)(1),
(2), (4) Date: Jun. 15, 2007

(87) PCT Pub. No.: WO2007/055108

PCT Pub. Date: May 18, 2007

(65) Prior Publication Data

US 2008/0004775 A1    Jan. 3, 2008

(30) Foreign Application Priority Data

Nov. 8, 2005   (JP)   ............. 2005-323303

(51) Int. Cl.
  B60R 22/28   (2006.01)
  B60R 21/00   (2006.01)
  B60R 21/01   (2006.01)
  B60L 3/00    (2006.01)
  B60N 2/42    (2006.01)

(52) U.S. Cl. ............. 701/45; 701/46; 701/47; 701/49; 180/271; 180/274; 180/281; 280/728.1; 280/734; 280/735; 280/753; 340/436; 340/438; 248/148; 297/216.12

(58) Field of Classification Search ............. 701/1, 701/29–36, 45–49; 248/118; 297/61, 216, 297/391, 404; 180/271–275, 282, 286
See application file for complete search history.

(56) References Cited

U.S. PATENT DOCUMENTS 4,977,973 A * 12/1990 Takizawa ............. 180/271

(Continued)

FOREIGN PATENT DOCUMENTS

DE   10 2006 000 368 A1   3/2007

(Continued)

*Primary Examiner*—Jack Keith
*Assistant Examiner*—Jonathan M Dager
(74) *Attorney, Agent, or Firm*—Oblon, Spivak, McClelland, Maier & Neustadt, L.L.P.

(57) ABSTRACT

A vehicle occupant protection device comprising a headrest configured to be movable forward with respect to a vehicle, and an actuator configured to implement the forward movement is disclosed. The device is configured to protect a vehicle occupant by operating the actuator to move the headrest forward in a pre-crash stage in the course of an object crashing into the vehicle from backside of the vehicle. The headrest is provided with an electrical capacitance sensor. The device is configured to control an amount of the forward movement of the headrest according to a variation manner of electrical capacitance, which electrical capacitance is detected by the electrical capacitance sensor when the headrest moves forward.

11 Claims, 11 Drawing Sheets

U.S. PATENT DOCUMENTS

| | | | | |
|---|---|---|---|---|
| 5,006,771 | A * | 4/1991 | Ogasawara | 318/568.1 |
| 5,694,320 | A * | 12/1997 | Breed | 701/45 |
| 5,934,750 | A * | 8/1999 | Fohl | 297/216.12 |
| 6,024,378 | A * | 2/2000 | Fu | 280/735 |
| 6,196,580 | B1 * | 3/2001 | Eberle et al. | 280/735 |
| 6,324,453 | B1 | 11/2001 | Breed et al. | |
| 6,371,513 | B1 * | 4/2002 | Fujimoto et al. | 280/730.2 |
| 6,385,517 | B1 * | 5/2002 | Kore | 701/45 |
| 6,393,133 | B1 | 5/2002 | Breed et al. | |
| 6,402,195 | B1 * | 6/2002 | Eisenmann et al. | 280/735 |
| 6,568,754 | B1 * | 5/2003 | Norton et al. | 297/216.12 |
| 6,604,788 | B1 * | 8/2003 | Humer | 297/216.13 |
| 6,666,292 | B2 * | 12/2003 | Takagi et al. | 180/274 |
| 6,761,403 | B2 * | 7/2004 | Pal et al. | 297/216.12 |
| 6,794,728 | B1 * | 9/2004 | Kithil | 257/532 |
| 6,805,404 | B1 * | 10/2004 | Breed | 297/216.12 |
| 6,983,989 | B1 * | 1/2006 | Veine et al. | 297/216.12 |
| 7,017,989 | B2 * | 3/2006 | Yamaguchi et al. | 297/216.12 |
| 7,369,928 | B2 * | 5/2008 | Wang et al. | 701/49 |
| 7,604,080 | B2 * | 10/2009 | Breed | 180/274 |
| 2001/0009327 | A1 * | 7/2001 | Zeigler | 280/735 |
| 2001/0040065 | A1 * | 11/2001 | Takagi et al. | 180/274 |
| 2003/0015898 | A1 | 1/2003 | Breed | |
| 2003/0090133 | A1 * | 5/2003 | Nathan et al. | 297/217.3 |
| 2003/0227199 | A1 * | 12/2003 | Yoshizawa et al. | 297/216.12 |
| 2004/0080425 | A1 * | 4/2004 | Sullivan et al. | 340/667 |
| 2006/0031015 | A1 * | 2/2006 | Paradie | 701/301 |
| 2006/0042851 | A1 * | 3/2006 | Herrmann et al. | 180/271 |
| 2006/0103215 | A1 * | 5/2006 | Hoffmeister et al. | 297/391 |
| 2007/0027599 | A1 | 2/2007 | Sakai et al. | |
| 2009/0069985 | A1 * | 3/2009 | Sakai et al. | 701/49 |
| 2009/0299576 | A1 * | 12/2009 | Baumann et al. | 701/45 |

FOREIGN PATENT DOCUMENTS

| | | |
|---|---|---|
| EP | 1 369 310 A1 | 12/2003 |
| JP | 11 180200 | 7/1999 |
| JP | 2001 264194 | 9/2001 |
| JP | 2004 9891 | 1/2004 |
| JP | 2005 87650 | 4/2005 |
| JP | 2007-30676 | 2/2007 |
| KR | 2000-0000155 | 1/2000 |

* cited by examiner

<NOMINAL STATE>  <OPERATING STATE>

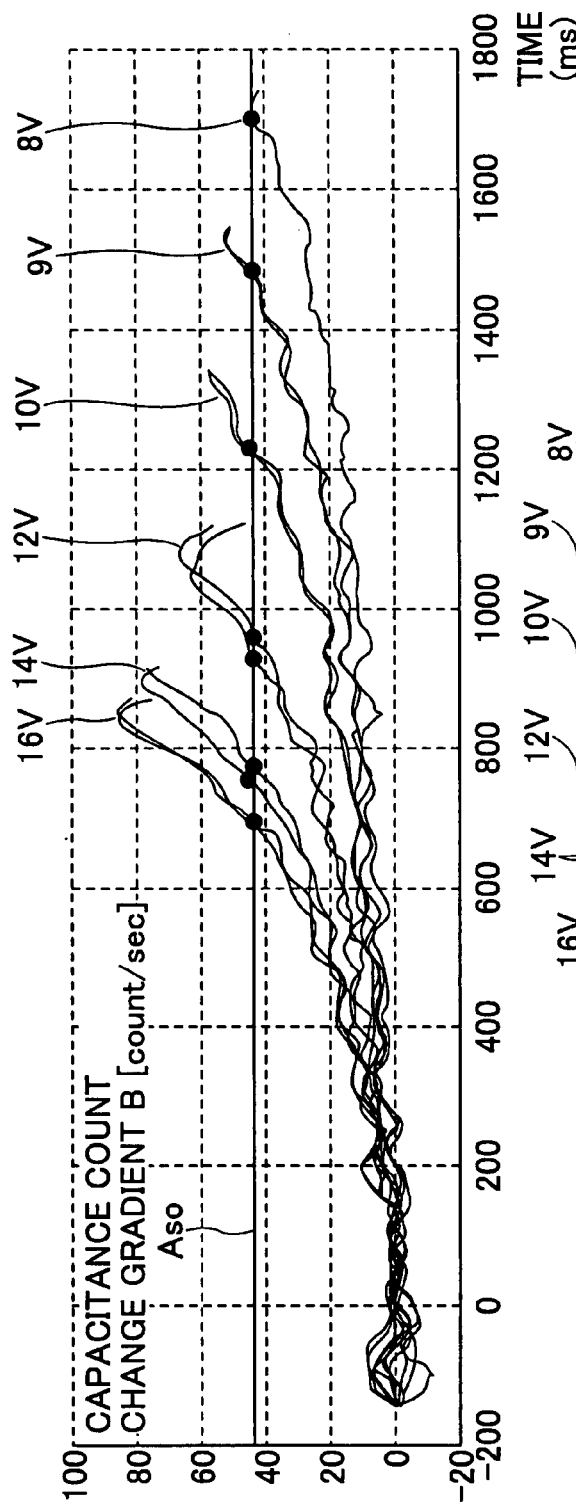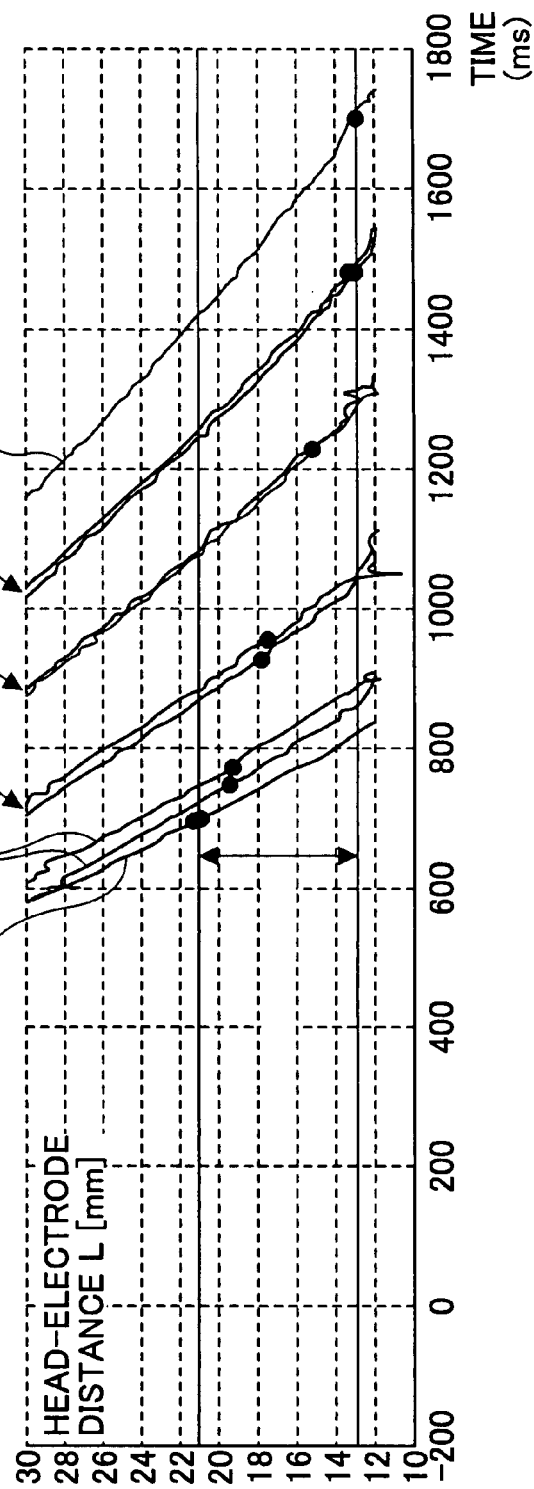
FIG.8A
FIG.8B

US 7,853,381 B2

OCCUPANT PROTECTION DEVICE

TECHNICAL FIELD

The present invention relates to a vehicle occupant protection device for protecting a vehicle occupant by moving a headrest, which is configured to be movable forward with respect to a vehicle, forward with respect to a vehicle in a pre-crash stage in the course of an object crashing into the backside of the vehicle.

BACKGROUND ART

JP2004-9891A discloses a vehicle occupant protection device described in an opening paragraph. In the vehicle occupant protection device disclosed in the document, the amount of the forward movement of the headrest is determined according to the magnitude of the relative speed between a bumping vehicle and a bumped vehicle or the amount of distortion so as to correspond to the amount of the backward movement of the head of the occupant at the time of the crash.

However, according to such prior art, since the distance between the headrest and the occupant's head is not considered in determining the amount of the forward movement of the headrest, the determined amount of the forward movement of the headrest can be inadequate depending on the distance between the headrest and the occupant's head, thereby failing to appropriately protect the occupant.

DISCLOSURE OF INVENTION

It is an object of the present invention to provide a vehicle occupant protection device which can appropriately determine the amount of the forward movement of the headrest.

In order to achieve the aforementioned objects, according to the first aspect of the present invention, vehicle occupant protection device configured to protect a vehicle occupant by moving a headrest, which is configured to be movable forward with respect to a vehicle, forward in a pre-crash stage in the course of an object crashing into a backside of the vehicle, characterized in that the headrest is provided with an electrical capacitance sensor, and said device is configured to control an amount of the forward movement of the headrest according to a variation manner of electrical capacitance, said electrical capacitance being detected by the electrical capacitance sensor when the headrest moves forward.

According to the second aspect of the present invention, in the first aspect of the present invention, said device is configured to control the amount of the forward movement of the headrest according to a rate of change in the detected electrical capacitance and a forward moving speed of the headrest.

According to the third aspect of the present invention, in the first aspect of the present invention, said device has movement stop means for stopping the forward movement of the headrest if the rate of change in the detected electrical capacitance exceeds a predetermined threshold, and said device is configured to correct the predetermined threshold or the rate of change in the detected electrical capacitance according to a forward moving speed of the headrest.

According to the fourth aspect of the present invention, in the second or third aspect of the present invention, a voltage or a current applied to an actuator of the forward movement of the headrest is used instead of the forward moving speed of the headrest.

According to the fifth aspect of the present invention, in the third aspect of the present invention, said device has second movement stop means for stopping the forward movement of the headrest if a magnitude of the detected electrical capacitance exceeds a predetermined threshold.

According to the sixth aspect of the present invention, in the first of the present invention, said device has voltage control means for controlling a voltage or a current applied to an actuator of the forward movement of the headrest to be maintained constant.

According to the present invention, a vehicle occupant protection device which can appropriately determine the amount of the forward movement of the headrest can be obtained.

BRIEF DESCRIPTION OF THE DRAWINGS

These and other objects, features, and advantages of the present invention will become more apparent from the following detailed description of preferred embodiments given with reference to the accompanying drawings, in which:

FIG. 8A is a diagram illustrating a variation manner of a capacitance count change gradient B in time-axis when the DC-motor 54 is driven at operating voltages varying in a wider range;

FIG. 8B is a diagram illustrating actual measurements of the head-electrode distance L in time-axis when the DC-motor 54 is driven at the operating voltages the same as those in FIG. 8A;

EXPLANATION FOR REFERENCE NUMBER 5 headrest
10 headrest-ECU
14 electrical capacitance sensor
40 PCS-ECU
42 back radar sensor
54 DC-motor
56 operating voltage control section

BEST MODE FOR CARRYING OUT THE INVENTION

Hereafter, the preferred embodiments according to the present invention are explained with reference to the drawings.

First Embodiment

Figure 1:
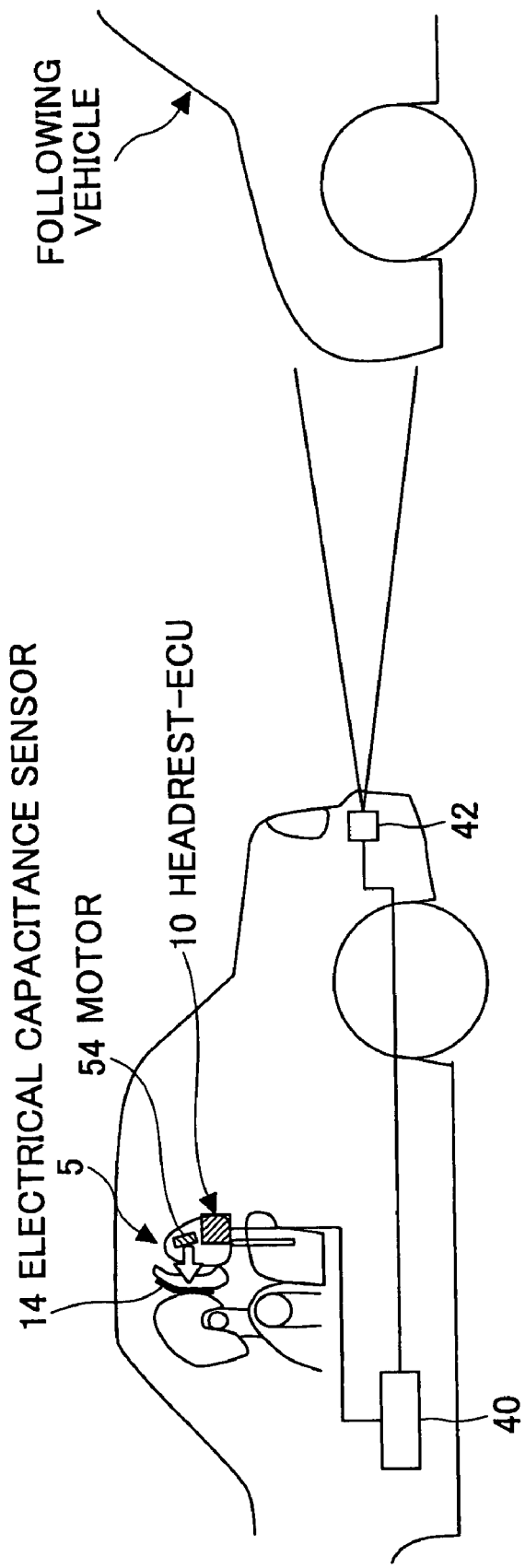
FIG. 1 is a schematic system diagram of a vehicle occupant protection device according to an embodiment of the present invention.
Figure 2:
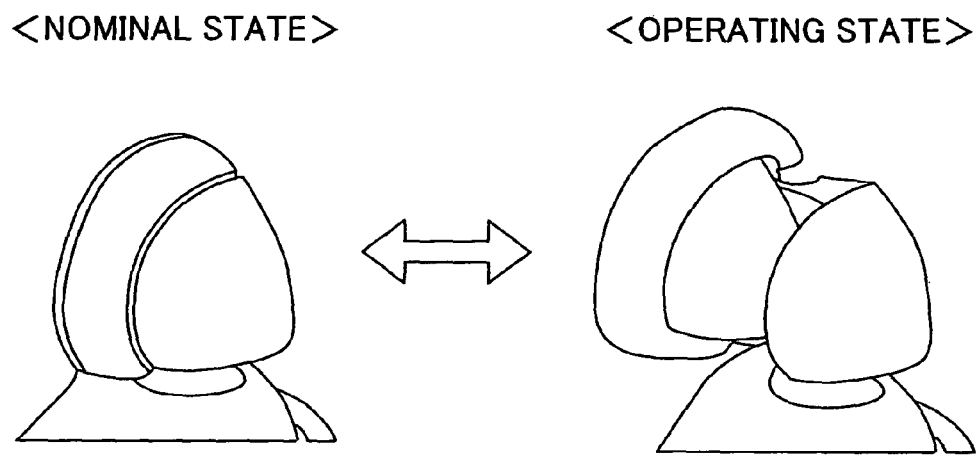
FIG. 2 is a diagram showing a headrest 5 in its normal state and the headrest 5 in a state after having moved forward.
Figure 3:
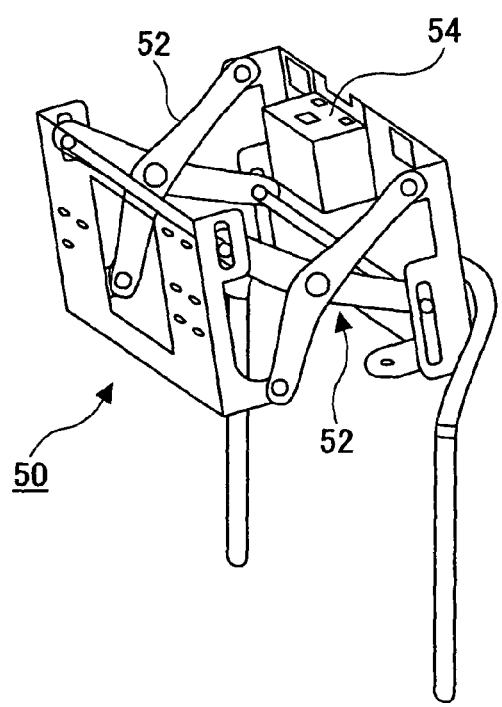
FIG. 3 is a perspective view of a driving mechanism for the headrest 5.

FIG. 1 is a schematic system diagram of a vehicle occupant protection device according to an embodiment of the present invention. In FIG. 1, the respective elements are illustrated in a picture of the vehicle viewed from a side of the vehicle. FIG. 2 is a diagram showing a headrest 5 in its normal state and the headrest 5 in a state after having moved forward. FIG. 3 is a perspective view of a driving mechanism for the headrest 5. It is noted that a vehicle in which the vehicle occupant protection device is installed is often referred as to "a base vehicle" hereafter.

The vehicle occupant protection device according to the present embodiment is mainly comprised of an electric control unit 10 (referred as to "headrest-ECU 10" hereafter). The headrest-ECU 10 is implemented by a micro computer comprising a CPU, a ROM, a RAM etc., inter-connected by a bus (not shown), as is the case with other ECUs.

The headrest 5 is provided on the top of a seat at a level of the back of the head of an occupant, as is the case with an ordinary headrest. The headrest 5 serves for supporting the head of the occupant from the backside thereof. The headrest 5 is configured to be movable forward and backward with respect to the vehicle, as shown in FIG. 2. In other words the headrest 5 is configured to be movable forward and backward with respect to the vehicle by means of a reversible actuator (for example, a DC-motor 54 which can rotates in reversible directions). It is noted that the headrest 5 is configured to move forward and backward in a slanting direction, in the example illustrated FIG. 2; however, it may be to move forward and backward in a horizontal plane.

In the example illustrated in FIG. 3, a driving mechanism of the headrest 5 includes a pair of X-arms 52, the X-arms 52 being located in corresponding left and right sides, and a DC-motor 54. The X-arms 52 are connected to an output shaft via a gear (not shown) such that the X-arms 52 open and close in response to the operation of the DC-motor 54. In this way, the X-arms 52 open or close in response to a nominal direction or a reversed direction of rotation of the DC-motor 54, and thus the headrest 5 moves forward or backward with respect to the vehicle. It is noted that the amount of the forward movement of the headrest 5 can be varied according to the operating amount of the DC-motor 54, and the forward moving speed of the headrest 5 is varied according to the operating speed (i.e., rotating speed) of the DC-motor 54.

Referring to FIG. 1 again, the headrest-ECU 10 is connected to an electrical capacitance sensor 14. The electrical capacitance sensor 14 is provided in a predetermined area of the headrest 5 and outputs an electrical signal corresponding to an electrical capacitance with respect to an object (typically, the head of the occupant) opposed to the predetermined area. The electrical capacitance sensor 14 may be provided to cover an effective area, which is intended to make contact with the back of the head of the occupant when the back of the head is supported by the headrest 5.

The headrest-ECU 10 is connected to a PCS (Pre-Crash System)-ECU 40 via an appropriate bus such as CAN (Controller Area Network). The PCS-ECU 40 is configured to determine a "crash unavoidable state" in which the crashing of an object (typically, a following vehicle) into the base vehicle cannot be avoided.

The PCS-ECU 40 is connected to a back (backscatter) radar sensor 42. The back radar sensor 42 monitors the status of a following object (typically, a following vehicle) existing in a rear direction with respect to the vehicle using a radio wave (a millimeter wave, for example), a light wave (a laser, for example) or an ultrasonic wave. The back radar sensor 42 acquires information representing a relationship between the following object and the base vehicle in a predetermined cycle, such as a relative speed, and a relative distance with respect to the base vehicle. In the case of the back radar sensor 42 being a millimeter wave radar sensor, the millimeter wave radar sensor, which uses a two-frequency continuous wave mode, for example, may measure the relative speed of the following object using a Doppler frequency of the radio wave, and a relative distance of the following object from phase information of two frequencies. Further, the back radar sensor 42 may detect a direction of the following object by scanning the radiated beam in a one-dimensional or two-dimensional manner. The detected data are transferred to the PCS-ECU 40 in a predetermined cycle.

The PCS-ECU 40 detects a relationship between the following object and the base vehicle, such as the relative speed, a relative distance, and a direction of the following object, using the information from the back radar sensor 42, and determines based on the detected result whether the crash with respect to the following object cannot be avoided. It is noted that various kinds of determination methods are proposed in the art of Front Pre-Crash System, which can be applied to the present embodiment in a similar manner. Further, the "crash unavoidable determination" is not necessarily implemented in an ON/OFF manner, and the crash unavoidable determination may be evaluated in a stepwise manner. Further, instead of or in addition to the back radar sensor 42, the information as to the relationship between other vehicle and the base vehicle may be acquired from the other vehicle via wireless communication between them, and/or may be acquired from image recognition information which is obtained from a stereo-camera imaging the scene behind the base vehicle. Whether the crash with respect to the following object cannot be avoided may be determined based on such acquired information.

If it is determined by the PCS-ECU 40 that the crash with respect to the following object cannot be avoided, this determination result is transferred to the headrest-ECU 10. The headrest-ECU 10 moves the headrest 5 forward in response to the determination result. In this way, at the subsequent crash, a sudden backward movement of the head of the occupant is reduced, and the occurrence of whiplash injury can be avoided effectively.

By the way, in moving the headrest 5 forward as is described above, it is critical to stop the forward movement of the headrest 5 at an adequate position. An example of the adequate position may be a position right before the contact position between the headrest 5 and the head of the occupant. This is because in such a position on the verge of the contact, it is possible to minimize the amount of the backward movement of the head of the occupant at the subsequent bump, and prevent an undesired effect on the head of the occupant due to an excessive amount of the forward movement of the headrest 5.

In this point, in the present embodiment, since the electrical capacitance sensor 14 is provided, such a configuration can be contemplated where the DC-motor 54 is controlled to move the headrest 5 such that the magnitude of the electrical capacitance (i.e., an absolute electrical capacitance) detected by the electrical capacitance sensor 14 becomes a predetermined target value which corresponds to the capacitance in the position on the verge of the contact.

However, since the magnitude of the electrical capacitance output from the electrical capacitance sensor 14 is influenced significantly by temperature and humidity, there is a problem in that it is difficult or impossible to appropriately set the predetermined target value.

To the contrary, according to the present embodiment, as is discussed in detail later with reference to the figures from FIG. 4, by using a variation manner of outputs of the electrical capacitance sensor 14 instead of the magnitude of the electrical capacitance output from the electrical capacitance sensor 14, it becomes possible to stop the headrest at the desired appropriate position with respect to the head of the occupant.

Figure 4:
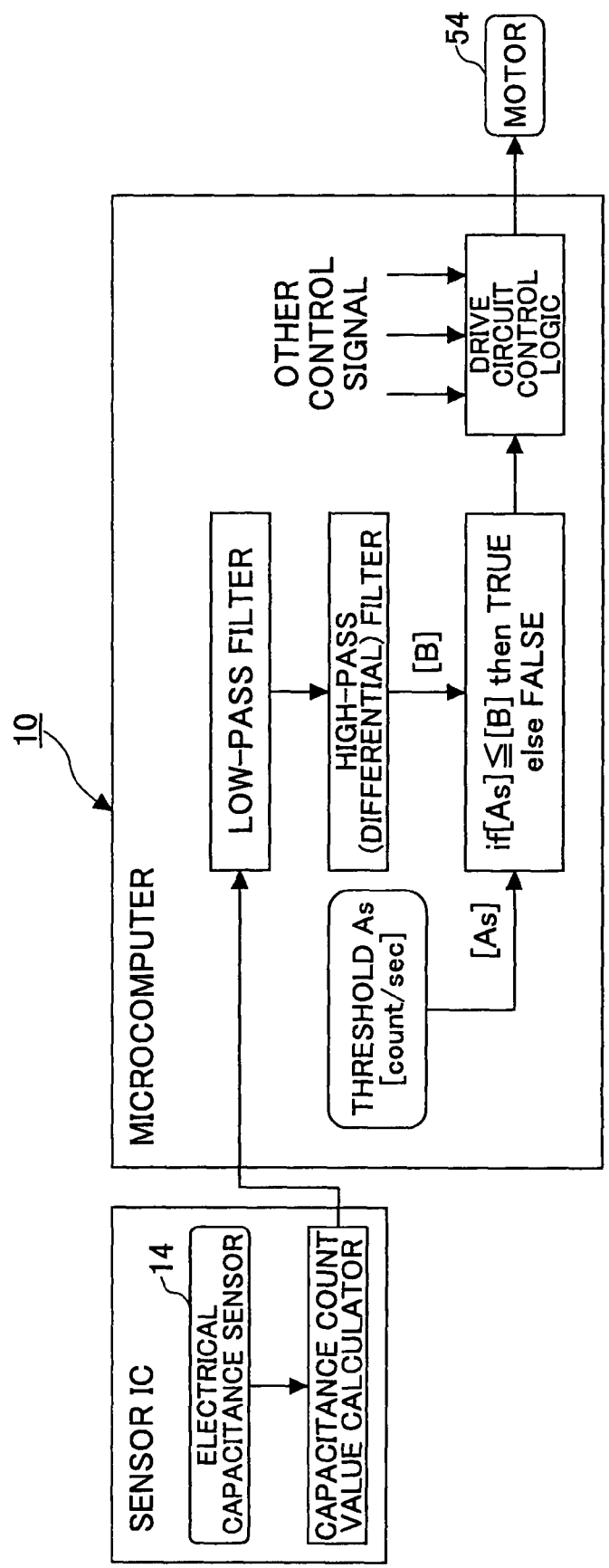
FIG. 4 is a functional block diagram illustrating an algorithm for stopping the forward movement of the headrest which is executed by a headrest-ECU 10 according to a first embodiment of the present embodiment.

FIG. 4 is a functional block diagram illustrating an algorithm for stopping the forward movement of the headrest which is executed by the headrest-ECU 10 according to a first embodiment of the present embodiment.

As is described above, when it is determined that the crash with respect to the following object cannot be avoided, and thus the operation of the DC-motor 54 (i.e., a supply of an operating voltage to the DC-motor 54) is initiated, the forward movement of the headrest 5 is initiated correspondingly. At this time, the output $C_0$ of the electrical capacitance sensor 14 is converted to a capacitance count value N by means of a sensor IC, and input to the headrest-ECU 10, as shown in FIG. 4. The capacitance count value N is a ratio of the output $C_0$ of the electrical capacitance sensor 14 to a predetermined reference capacitance Cs. In other words, $N=C_0/Cs$. The capacitance count value N is input to the headrest-ECU 10 in a predetermined cycle once the forward movement of the headrest 5 is initiated.

The capacitance count value N input to the headrest-ECU 10 is passed to a low-pass filter and a high-pass (differential) filter, and thus a rate of change (gradient) in the electrical capacitance B ($B=dN/dt$) is calculated. In other words, the amount of change of capacitance count value N with respect to time is calculated based on capacitance count value N input in the predetermined cycle. Hereafter, the rate of change in the electrical capacitance derived in the aforementioned manner is referred to as "a capacitance count change gradient B".

The capacitance count change gradient B is compared to a predetermined threshold $A_s$. The setting manner of the predetermined threshold $A_s$ is described later. If the capacitance count change gradient B exceeds the predetermined threshold $A_s$, then an operation stop instruction is output to the DC-motor 54 via a driving circuit control logic section. Then, the supply of the operating voltage to the DC-motor 54 is stopped, and thus the forward movement of the headrest 5 is stopped.

In this way, in the example illustrated in FIG. 4, if the capacitance count change gradient B in the course of the forward movement of the headrest 5 exceeds the predetermined threshold As, then the operation stop instruction is output to the DC-motor 54, and thus the forward movement of the headrest 5 is stopped.

Figures 5A, 5B:
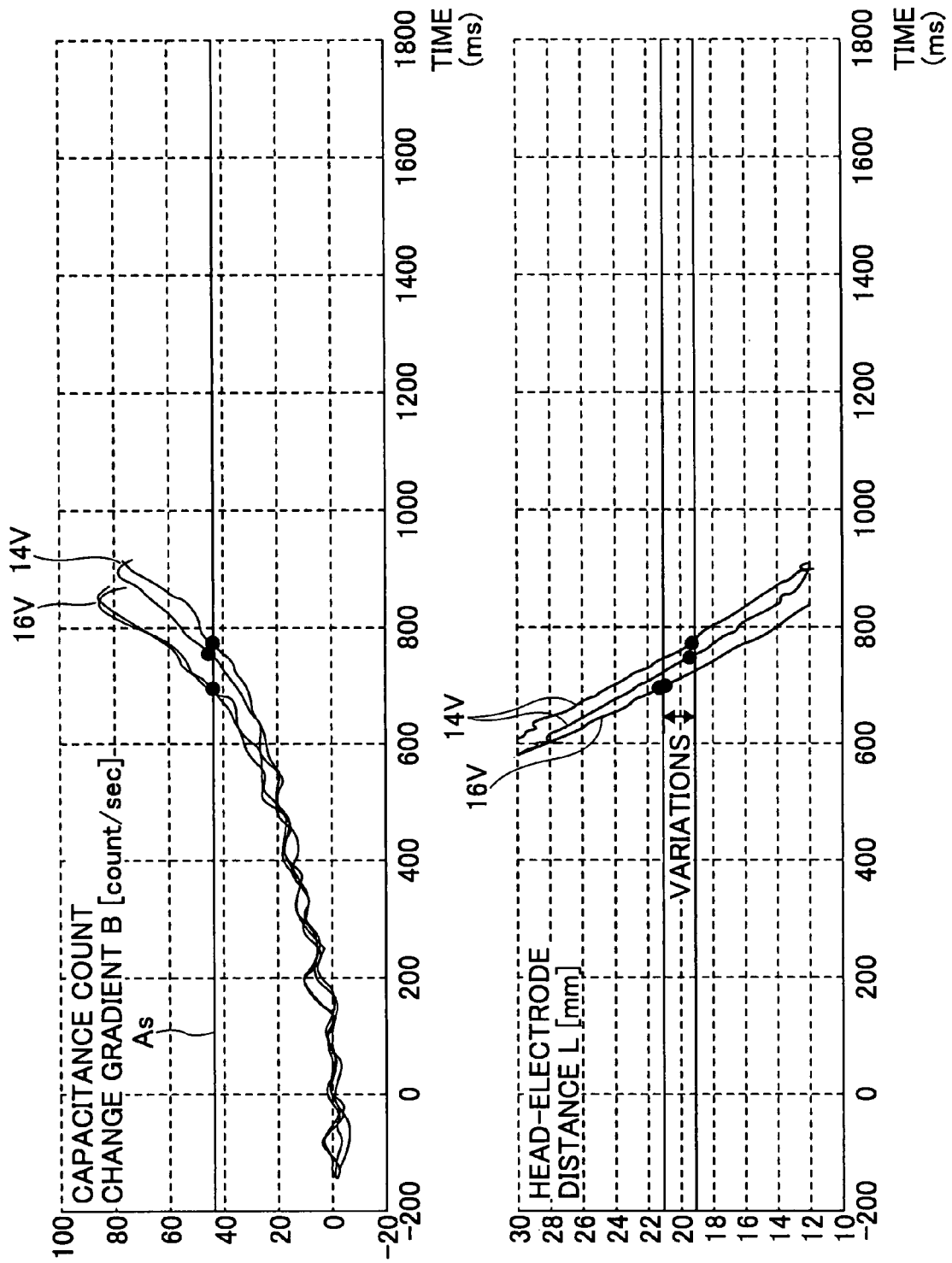
FIG. 5A is a diagram illustrating a variation manner of a capacitance count change gradient B in time-axis when a DC-motor 54 is driven at operating voltages (14 V, and 16 V)
FIG. 5B is a diagram illustrating actual measurements of a head-electrode distance L in time-axis when the DC-motor 54 is driven at operating voltages (14 V, and 16 V)

FIG. 5A is a diagram illustrating a variation manner of the capacitance count change gradient B in time-axis when the DC-motor 54 is driven at certain operating voltages, and FIG. 5B is a diagram illustrating actual measurements of a distance L between a head and the electrical capacitance sensor 14 (an electrode). in time-axis (referred to as "a head-electrode distance L", hereafter) at that time. In the respective figures, four curves represent variation manners measured twice when the operating voltage is 14 V and measured twice when the operating voltage is 16 V, respectively. Further, in the respective figures, the points where the capacitance count change gradient B exceeds the predetermined threshold $A_s$ (i.e., the stop timings of the forward movement of the headrest 5) are indicated by black circular marks.

From FIG. 5A it can be understood that the capacitance count change gradient B as a whole increases with the passage of time, and the head-electrode distance L decreases with the passage of time. Further, from FIG. 5A and FIG. 5B, it can be understood that in the case of the operating voltage being 16 V, the head-electrode distances L when the capacitance count change gradient B exceeds the predetermined threshold $A_s$ are substantially identical, as is understood from the fact that the two curves related to the operating voltage 16 V present a substantially identical variation manner, and similarly in the case of the operating voltage being 14 V, the head-electrode distances L when the capacitance count change gradient B exceeds the predetermined threshold $A_s$ are substantially identical, as is understood from the fact that the two curves related to the operating voltage 14 V present a substantially identical variation manner. From the fact, it can be understood that if the operating voltage can be maintained constant, it becomes possible to stop the headrest 5 at the desired position (the position on the verge of the contact, for example) without variations between the respective operations by setting an appropriate threshold $A_s$ with respect to the capacitance count change gradient B. Further, it can be understood that if the difference between the operating voltages is not so large (i.e., if the difference is within about 2 V between 14 V and 16 V as is the case with the illustrated example), the variations between the head-electrode distances L when the capacitance count change gradient B exceeds the predetermined threshold $A_s$ are limited to some extent (2-3 mm). From this, it can be understood that even if the operating voltage cannot be maintained constant, if the variations in the operating voltages are not so large, it becomes possible to stop the headrest 5 at the desired position without variations between the respective operations.

Here, it is especially noted that the capacitance count change gradient B is not influenced by temperature or humidity, in contrast to the magnitude of the electrical capacitance. In other words, even if the magnitude of the electrical capacitance varies greatly according to the change in temperature or humidity, the capacitance count change gradient B itself doesn't vary greatly. Therefore, according to the present embodiment, by controlling the amount of the forward movement of the headrest 5 based on the rate of change in the electrical capacitance output from the electrical capacitance sensor 14 (i.e., the capacitance count change gradient B), it becomes possible to stop the headrest 5 at the desired position in a robust manner without being influenced by the variations in temperature or humidity.

Second Embodiment

Figure 6:
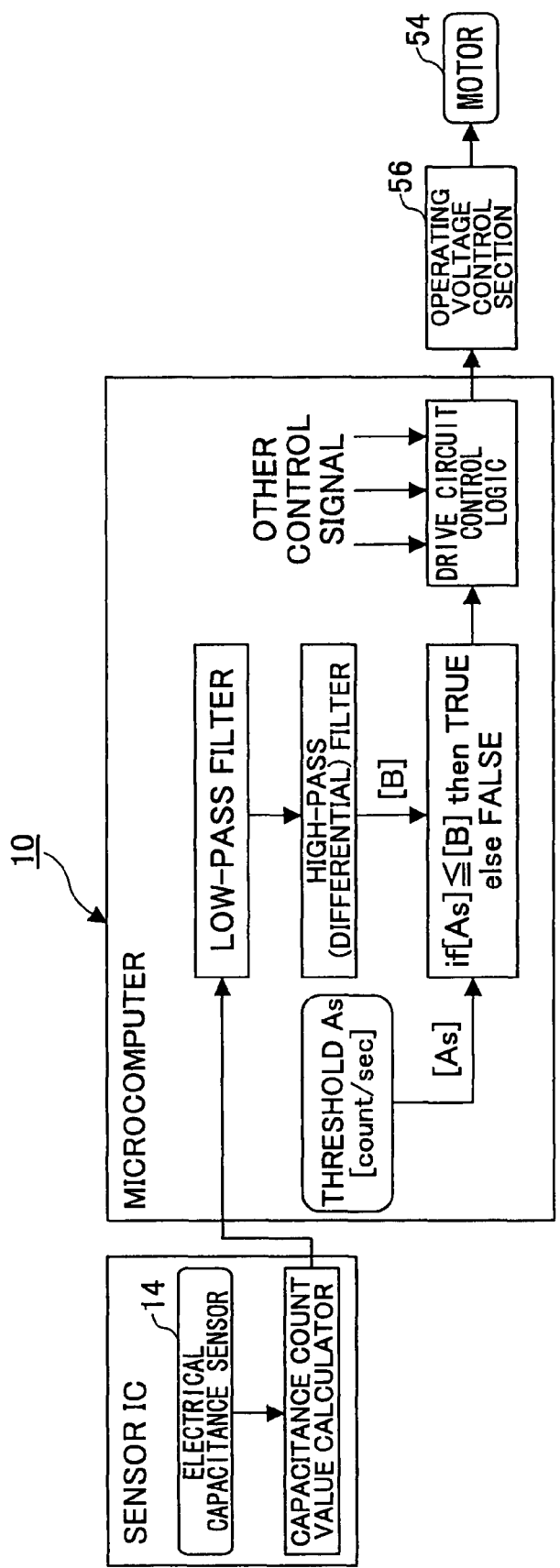
FIG. 6 is a functional block diagram illustrating an algorithm for stopping the forward movement of the headrest which is executed by a headrest-ECU 10 according to a second embodiment of the present embodiment.

Next, the vehicle occupant protection device according to the second embodiment of the present invention is explained with referring to FIG. 6. FIG. 6 is a functional block diagram illustrating an algorithm for stopping the forward movement of the headrest which is executed by a headrest-ECU 10 according to the second embodiment of the present embodiment. Hereafter, only the configuration unique to the second embodiment is explained, assuming that the other configuration is the same as that of the first embodiment.

In the present embodiment, an operating voltage control section 56 is provided for controlling the operating voltage (or the operating current) so as to be a substantially constant value, as shown in FIG. 6. This is because in an actual vehicle a power source (i.e., a battery) for supplying the operating voltage of the DC-motor 54 also functions as a supply source for other various loads (a starter, an audio device, an air-conditioning device, head lamps, fog lamps, cornering signal lamps, etc.) and thus the voltage supplied to the DC-motor 54 may vary dynamically according the operating status of other loads, and the voltage may vary with time due to reduced capacitance (degradation) of the battery itself, etc.

The operating voltage control section 56 controls the voltage, which is supplied from the battery, for example, so as to be maintained constant, and then supplies the controlled voltage to the DC-motor 54. For example, a DC-DC converter (a boosting circuit) may be provided in the power supply line from the battery to the DC-motor 54. In this case, the operating voltage control section 56 controls an output duty (i.e., duty ratio) of the DC-DC converter according to the input voltage thereof so as that the voltage supplied to the DC-motor 54 from the battery is maintained constant. According to the configuration, it is possible to reduce the variations in the stop positions of the headrest 5 with respect to the head of the occupant (see FIG. 5B), which variations would otherwise occur due to the variations in the operating voltages of the DC-motor 54 as described above.

Third Embodiment

Figure 7:
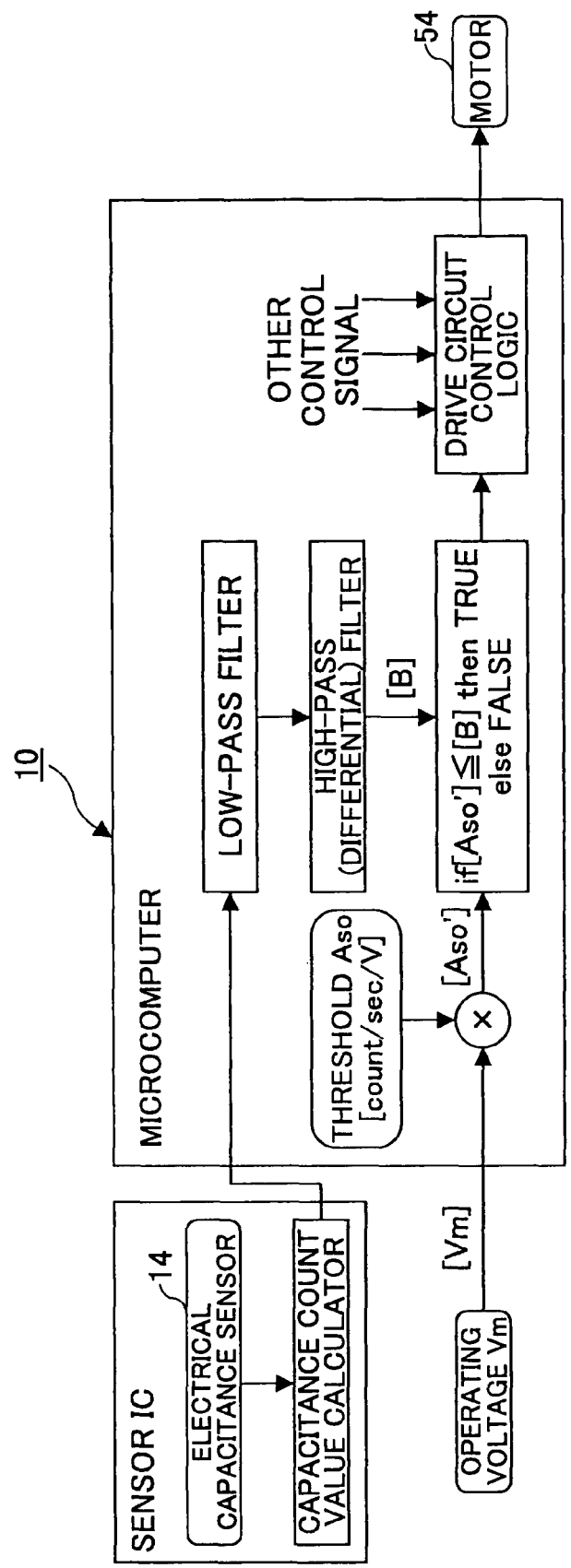
FIG. 7 is a functional block diagram illustrating an algorithm for stopping the forward movement of the headrest which is executed by a headrest-ECU 10 according to a third embodiment of the present embodiment.

Next, the vehicle occupant protection device according to the third embodiment of the present invention is explained with reference to the figures from FIG. 7. FIG. 7 is a functional block diagram illustrating an algorithm for stopping the forward movement of the headrest which is executed by a headrest-ECU 10 according to the third embodiment of the present embodiment. Hereafter, only the configuration unique to the third embodiment is explained, assuming that the other configuration is the same as that of the first embodiment.

In the example illustrated in FIG. 7, the predetermined threshold $A_{s0}$ is corrected according to the operating voltage Vm of the DC-motor 54. In the illustrated example, the predetermined threshold $A_{s0}$ is multiplied by the operating voltage Vm. The corrected predetermined threshold $A_{s0}'$ ($=A_{s0} \times$ Vm) is compared to the capacitance count change gradient B. The purpose of this correction is described later. If the capacitance count change gradient B exceeds the corrected predetermined threshold $A_{s0}'$, then the operation stop instruction is output to the DC-motor 54 via the driving circuit control logic section. Then, the supply of the operating voltage to the DC-motor 54 is stopped, and thus the forward movement of the headrest 5 is stopped.

In this way, in the example illustrated in FIG. 7, if the capacitance count change gradient B in the course of the forward movement of the headrest 5 exceeds the corrected predetermined threshold $A_{s0}'$, then the operation stop instruction is output to the DC-motor 54, and thus the forward movement of the headrest 5 is stopped.

FIG. 8A is a diagram illustrating a variation manner of the capacitance count change gradient B in time-axis when the DC-motor 54 is driven at certain operating voltages, and FIG. 8B is a diagram illustrating actual measurements of the head-electrode distance L at that time. In the respective figures, twelve curves represent data measured when the respective different operating voltages (twice for each of 16 V, 14 V, 12 V, 10 V, 9 V, and 8 V) are supplied to the DC-motor 54. Further, in the respective figures, the points where the capacitance count change gradient B exceeds the predetermined threshold $A_{s0}$ are indicated by black circular marks.

From FIGS. 8A and 8B, it can be understood that if the operating voltage varies in a wide range, such as varying from 8 V to 16 V, the head-electrode distance L when the capacitance count change gradient B exceeds the predetermined threshold $A_{S0}$ has relatively large variations (8-9 mm). On the other hand, if the operating voltages are the same, the head-electrode distances L when the capacitance count change gradient B exceeds the predetermined threshold $A_{S0}$ are substantially identical, as is understood from the fact that the two curves related to the respective operating voltages present a substantially identical variation manner. From this, it can be understood that it becomes possible to stop the headrest 5 at the desired position without variations between the respective operating voltages by setting an appropriate threshold $A_{S0}$ according to the operating voltage Vm of the DC-motor 54.

Here, the proffered way of setting the threshold $A_{s0}'$ according to the operating voltage Vm of the DC-motor 54 is described.

First, examining the relationship between the operating voltage Vm of the DC-motor 54 and the capacitance count change gradient B, the fact that the head-electrode distance L when the capacitance count change gradient B exceeds the predetermined threshold $A_{s0}$ varies as the operating voltage Vm varies as is described above is due to the fact that the forward moving speed of the headrest 5 varies according to the variations in the operating voltage Vm.

Figure 9:
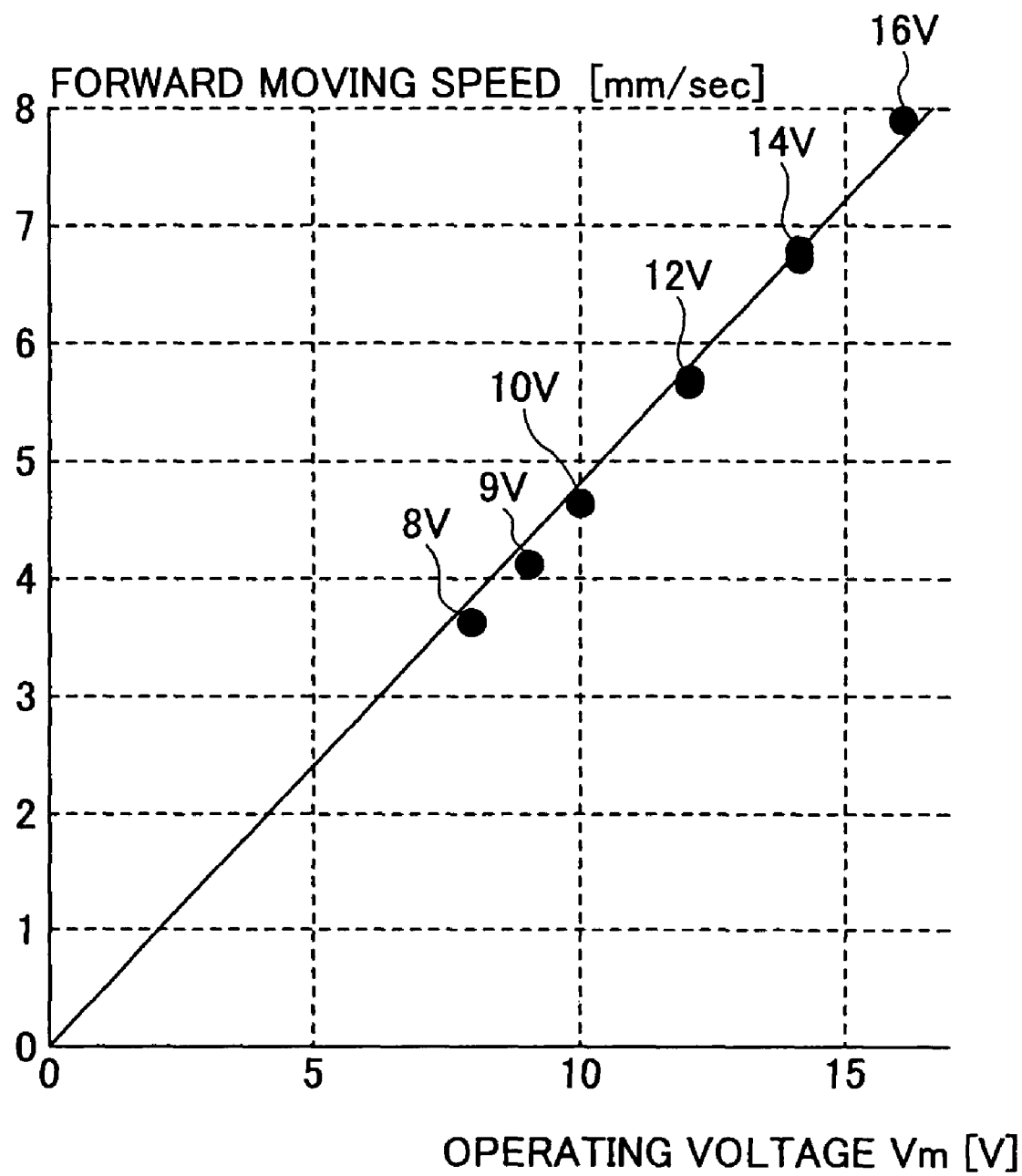
FIG. 9 is a graph illustrating a relationship between the operating voltages of the DC-motor 54 and the forward moving speed of the headrest 5.

FIG. 9 is a graph illustrating a relationship between the operational voltages of the DC-motor 54 and the forward moving speed of the headrest 5. The respective points correspond to the cases of the operating voltage Vm being 16 V, 14 V, 12 V, 10 V, 9 V, and 8 V. From FIG. 9, it can be understood that the relationship between the operational voltages of the DC-motor 54 and the forward moving speed of the headrest 5 can be represented by a line with approximate calculation, that is to say, a proportional relationship.

Here, it can be understood that the capacitance count change gradient B (=dN/dt) depends on dN/dL and dL/dt, because the capacitance count change gradient B can be expressed as B(=dN/dt)=dN/dL×dL/dt, using a rate of change in the head-electrode distance L (=dL/dt). The rate of change dL/dt in the head-electrode distance L depends on the forward moving speed of the headrest 5 in a linear manner, and thus the capacitance count change gradient B depends on the operational voltage Vm of the DC-motor 54 in a linear manner. From this, it can be predicted that if the capacitance count change gradient B is divided by the operational voltage Vm of the DC-motor 54, it becomes possible to eliminate the dependence (dL/dt) of the capacitance count change gradient B on the operational voltage and leave only the dependence (dN/dL) of the capacitance count change gradient B on the head-electrode distance L. Hereafter, a value B/Vm obtained by dividing the capacitance count change gradient B by the operational voltage Vm of the DC-motor 54 is referred as to a normalized change gradient B/Vm.

Figure 10A:
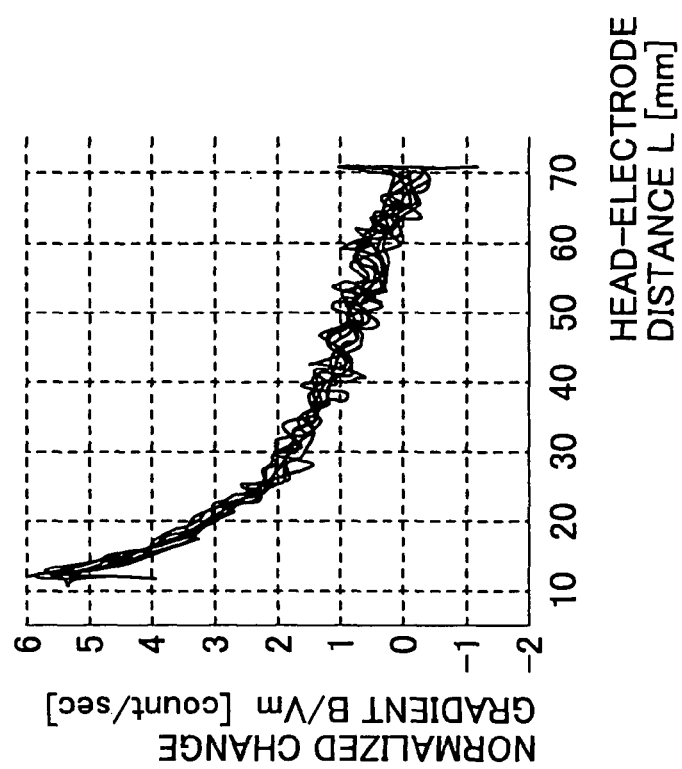
FIG. 10A is a diagram illustrating a relationship between the capacitance count change gradient B and the head-electrode distance L.
Figure 10B:
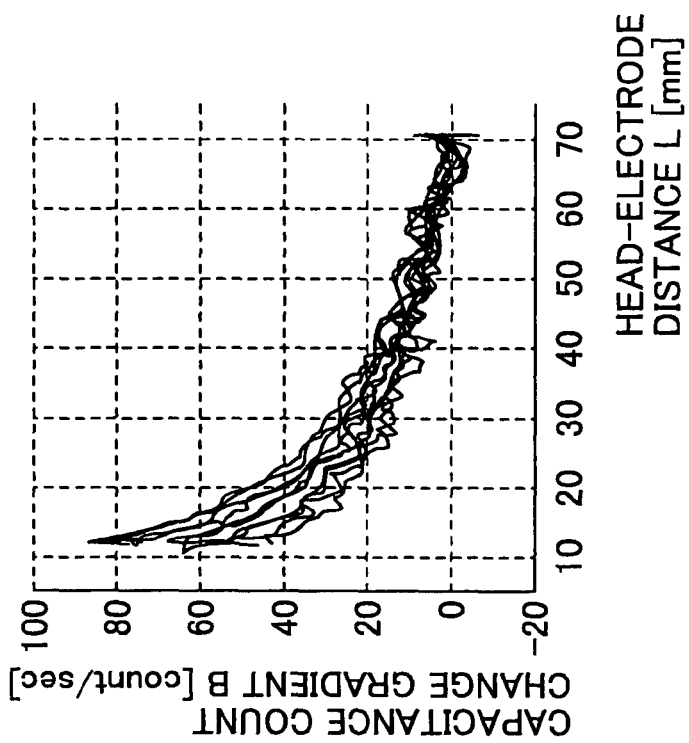
FIG. 10B is a diagram illustrating a relationship between a normalized change gradient B/Vm and the head-electrode distance L.

FIG. 10A is a diagram illustrating a relationship between the capacitance count change gradient B and the head-electrode distance L, and FIG. 10B is a diagram illustrating a relationship between the normalized change gradient B/Vm and the head-electrode distance L. In the respective figures, twelve curves represent data measured when the respective different operating voltages (twice for each of 16 V, 14 V, 12 V, 10 V, and 9 V, and once for 8 V) are supplied to the DC-motor 54. As shown in FIG. 10, the relationship between the capacitance count change gradient B and the head-electrode distance L varies largely depending on the operating voltage Vm, while the relationship between the normalized change gradient B/Vm and the head-electrode distance L has small variations. From this, it can be understood that if the capacitance count change gradient B is divided by the operational voltage Vm of the DC-motor 54, it becomes possible to eliminate the dependence of the capacitance count change gradient B on the operational voltage.

Figures 11A, 11B:
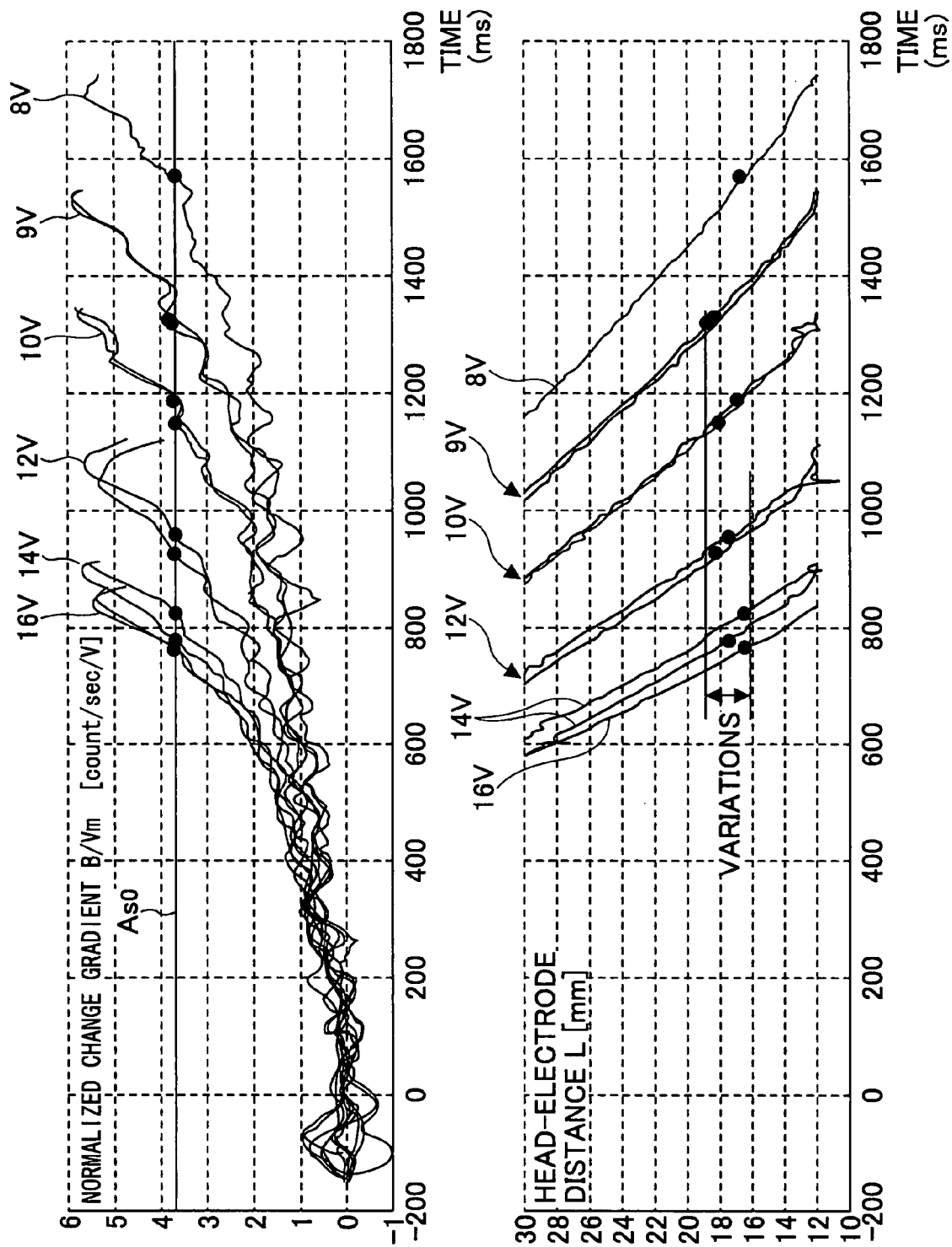
FIG. 11A is a diagram illustrating a variation manner of the normalized change gradient B/Vm in time-axis when the DC-motor 54 is driven at the respective operating voltages.
FIG. 11B is a diagram illustrating actual measurements of the head-electrode distance L in time-axis when the DC-motor 54 is driven at the respective operating voltages the same as those in FIG. 11A.

FIG. 11A is a diagram illustrating a variation manner of the normalized change gradient B/Vm in time-axis when the DC-motor 54 is driven at certain operating voltages, and FIG. 11B is a diagram illustrating a variation manner of actual measurements of the head-electrode distance L at that time in time-axis. In the respective figures, eleven curves represent data measured when the respective different operating voltages (twice for each of 16 V, 14 V, 12 V, 10 V, and 9 V, and once for 8 V) are supplied to the DC-motor 54. Further, in the respective figures, the points where the capacitance count change gradient B exceeds the predetermined threshold Aso (i.e., the stop timings of the forward movement of the headrest) are indicated by black circular marks.

As is understood by comparing to FIG. 8A and FIG. 8B, from FIG. 11A and FIG. 11B, it can be understood that even if the operating voltage varies in a wide range, such as varying from 8 V to 16 V, the variations in the head-electrode distances L when the normalized change gradient B/Vm exceeds the predetermined threshold $A_{s0}$ fall within a relatively small range (2-3 mm). From this, it can be understood that it becomes possible to stop the headrest 5 at the desired position without variations between the respective operations by setting an appropriate threshold $A_{s0}$ with respect to the normalized change gradient B/Vm (for example, the threshold $A_{s0}$ may be set to a value of the normalized change gradient B/Vm at the desired head-electrode distance L at an average operating voltage). In other words, even if the operating voltage cannot be maintained constant, it becomes possible to stop the headrest 5 at the desired position without variations between the respective operations.

It is noted that, according to the configuration shown in FIG. 7, the threshold $A_{s0}$ is corrected by being multiplied by the operating voltage Vm; however, this configuration is equivalent to a configuration in which the normalized change gradient B/Vm is compared to the threshold $A_{s0}$. In other words, the determination using criteria $A_{s0} \leq B/Vm$ is equivalent to the determination using criteria $A_{s0}' (=A_{s0} \times Vm) \leq B/Vm$.

In this way, according to the present embodiment, since the dependence of the capacitance count change gradient B on the operational voltage of the DC-motor 54 is appropriately eliminated, it becomes possible to stop the headrest 5 at the desired position without variations between the respective operations.

Therefore, in the present embodiment, it is possible to eliminate the need for the operating voltage control section 56 (and the DC-DC converter) such as described in the afore-mentioned second embodiment. However, in the present embodiment, such an operating voltage control section 56 may be provided so as to change the forward moving speed of the headrest 5 by actively changing the operating voltage of the DC-motor 54 under the control of the operating voltage control section 56. In this case, it becomes possible to immediately move the headrest 5 to the desired position and stop it at the desired position, if the remaining time before the crash event is short. In this case, similarly, it is possible to stop the headrest 5 at the desired position without variations between the respective operations by using an appropriate threshold $A_{s0}$ according to the operating voltage Vm of the DC-motor 54.

Fourth Embodiment

Figure 12:
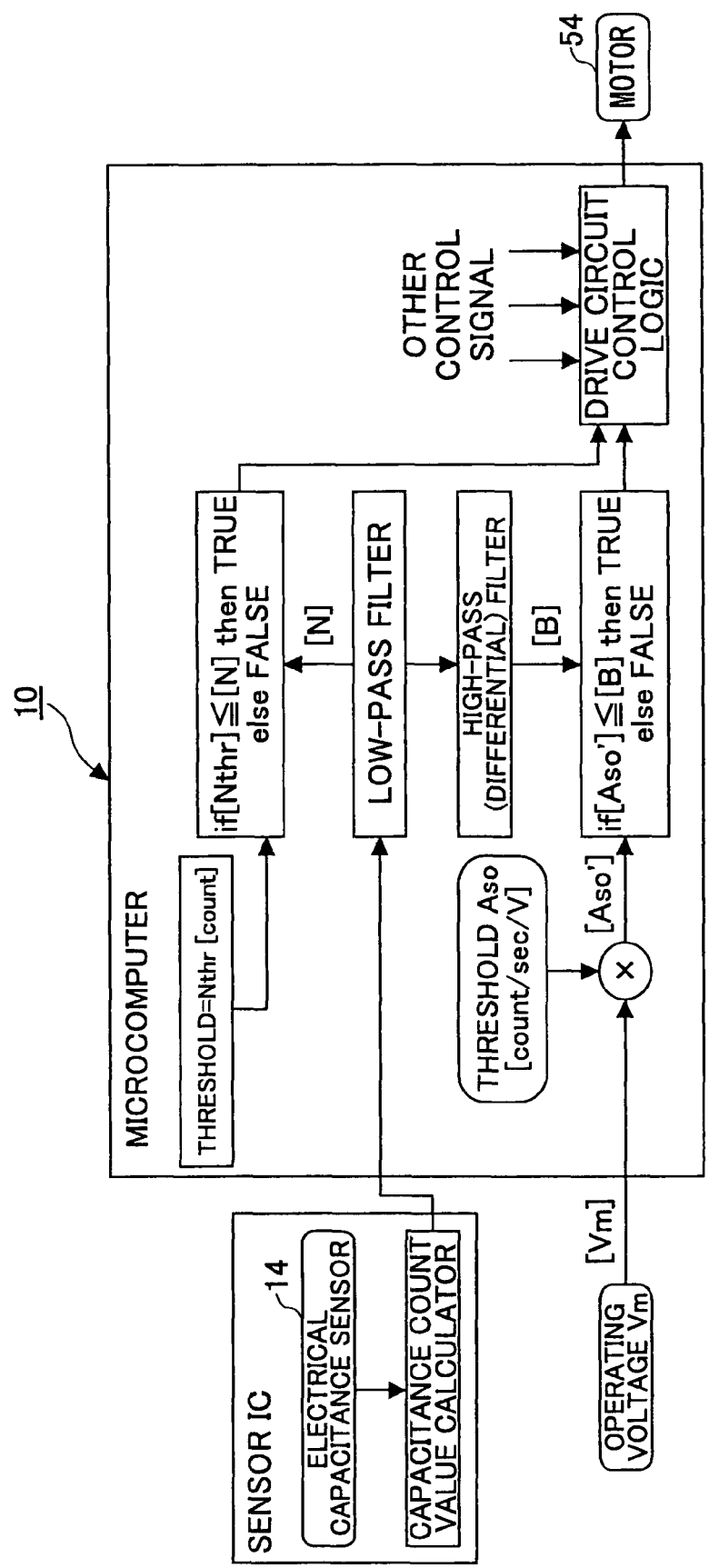
FIG. 12 is a functional block diagram illustrating an algorithm for stopping the forward movement of the headrest which is executed by a headrest-ECU 10 according to a fourth embodiment of the present embodiment.

Next, the vehicle occupant protection device according to the fourth embodiment of the present invention is explained with reference to FIG. 12. FIG. 12 is a functional block diagram illustrating an algorithm for stopping the forward movement of the headrest which is executed by a headrest-ECU 10 according to the fourth embodiment of the present embodiment. Hereafter, only the configuration unique to the fourth embodiment is explained, assuming that the other configuration is the same as that of the third embodiment.

The present fourth embodiment is related to a configuration in which a determination logic related to an absolute value of the electrical capacitance (i.e., the capacitance count value N) is used in addition to the aforementioned determination logic related to the capacitance count change gradient B (=dN/dt).

Specifically, as shown in FIG. 12, the capacitance count value N input to the headrest-ECU 10 is passed to the low-pass filter and then is compared to a predetermined threshold $N_{thr}$. The predetermined threshold $N_{thr}$ is set to be larger than a value measured when the headrest 5 comes to contact with the head of the occupant. For example, the predetermined threshold $N_{thr}$ is set to a large value, such as a value measured when the head of the occupant is pressed against the headrest 5.

If the capacitance count change gradient B exceeds the corrected predetermined threshold $A_{s0}'$ ($=A_{s0} \times Vm$) or the capacitance count value N exceeds the predetermined threshold $N_{thr}$, then the operation stop instruction is output to the DC-motor 54 via the driving circuit control logic section. Then, the supply of the operating voltage to the DC-motor 54 is stopped, and thus the forward movement of the headrest 5 is stopped.

By the way, if the head of the occupant moves in a direction oriented away from the headrest 5 due to an inertial force at the harsh braking or an occupant's own action, the capacitance count change gradient B in the course of the forward movement of the headrest 5 doesn't tend to increase greatly. Thus, in such a situation, there is a possibility that the capacitance count change gradient B doesn't exceed the corrected predetermined threshold $A_{s0}'$ ($=A_{s0} \times Vm$), and thus the headrest 5 continues to move beyond the position on the verge of the contact until the headrest 5 reaches the contact position or even the position where the headrest 5 pushes the head of the occupant forward.

On the other hand, through the capacitance count value N is influenced by the temperature and humidity as described above, the capacitance count value N is not influenced greatly by the temperature and humidity after the headrest 5 comes in contact with the head of the occupant. Therefore, after the headrest 5 comes in contact with the head of the occupant, the absolute value of the electrical capacitance can be utilized as a useful index for expressing the distance between the head of the occupant and the headrest 5, which index is not influenced by the temperature and humidity.

Therefore, according to the present embodiment, as is described above, by adding the determination logic related to the absolute value of the electrical capacitance (i.e., the capacitance count value N), it becomes possible to stop the headrest 5 until the headrest 5 reaches the contact position or the position where the headrest 5 pushes the head of the occupant forward at latest, even if the head of the occupant moves away from the headrest 5, for example. It is noted that if the head of the occupant moves toward the headrest 5, it is possible to stop the headrest 5 at the desired position, because the capacitance count change gradient B is likely to exceed the corrected predetermined threshold $A_{s0}'$ ($=A_{s0} \times Vm$) as is described above.

It is noted that although the present embodiment is combined with the aforementioned third embodiment, the present embodiment can be combined with the aforementioned first or second embodiment.

Further, in any embodiment of the aforementioned four embodiments, a touch sensor for detecting contact between the headrest 5 and the head of the occupant may be provided separately to ensure a failsafe function for preventing the excessive forward movement of the headrest 5. In this case, if an ON signal (see "other control signals in FIG. 4, etc.) is input from the touch sensor while controlling the DC-motor 54 based on the output of the capacitance count change gradient B as described above, then the headrest-ECU 10 stops the forward movement of the headrest 5 by immediately stopping the drive of the DC-motor 54. According to this, it becomes possible to ensure that the headrest 5 doesn't excessively move forward.

The present invention is disclosed with reference to the preferred embodiments. However, it should be understood that the present invention is not limited to the aforementioned embodiments, and variations and modifications may be made without departing from the scope of the present invention.

For example, although in the aforementioned embodiments the capacitance count change gradient B in each cycle is calculated by differentiation of the capacitance count value N input in each cycle, the capacitance count change gradient B may be derived based on the capacitance count value N(t0) at the time t0 when the DC-motor 54 starts to operate and the capacitance count value N(t1) at the present time t1. Specifically, the capacitance count change gradient B may be derived according to the equation $B=(N(t1)-N(t0))/(t1-t0)$.

Furthermore, in a simplified embodiment, it is also possible to use an amount of change in electrical capacitance instead of using the capacitance count change gradient B. For example, the forward movement of the headrest 5 may be stopped if a differential between the capacitance count value N(t0) at the time t0 when the DC-motor 54 starts to operate and the capacitance count value N(t1) at the present time t1 exceeds a predetermined threshold. Or, the forward movement of the headrest 5 may be stopped if the capacitance count value N increases more than a predetermined threshold within a predetermined time interval from the time when the DC-motor 54 starts to operate. Also in these configurations, as is the case with the aforementioned third embodiment, the differential or the predetermined threshold may be corrected according to the forward moving speed of the headrest 5 (or the operating voltage of the DC-motor 54).

Furthermore, although in the aforementioned third embodiment the threshold $A_{s0}'$ according to the operating voltage of the DC-motor 54 (the voltage applied to the DC-motor 54) is used based on the fact that the forward moving speed of the headrest 5 changes proportionately with respect to the operating voltage of the DC-motor 54, a similar threshold $A_{s0}'$ according to the operating current of the DC-motor 54 (the current applied to the DC-motor 54) may be used.

Furthermore, although in the aforementioned embodiments it is assumed that the orientation of the occupant's face is a very front orientation, the aforementioned embodiments may be combined with an other configuration, such a configuration in which the amount of the forward movement of the headrest 5 (i.e., the threshold $A_s$, etc.) is determined according to the orientation of the occupant's face which can be detected by an image recognition technique using a camera installed in the cabin.

The present application is based on Japanese Priority Application No. 2005-323303, filed on Nov. 8, 2005, the entire contents of which are hereby incorporated by reference.

The invention claimed is:

1. A vehicle occupant protection device comprising:
   a headrest configured to be movable forward with respect to a vehicle;
   a processor configured to determine whether a collision can be avoided;
   an actuator configured to receive collision information from the processor and to implement the forward movement of the headrest in a pre-crash stage before an object crashes into a backside of the vehicle, the pre-crash stage indicating that a crash cannot be avoided; and
   an electrical capacitance sensor disposed in the headrest and connected to the processor, and
   wherein the processor is configured to control an amount of the forward movement of the headrest during the pre-crash stage according to an electrical capacitance change gradient, which is derived from a change in a ratio of a detected electrical capacitance and a reference electrical capacitance with respect to a change in time, and
   wherein said detected electrical capacitance is detected by the electrical capacitance sensor when the headrest moves forward.

2. A vehicle occupant protection device, comprising:
   a headrest;
   a processor configured to determine whether a collision can be avoided; and
   a driving mechanism configured to receive collision information from the processor and to drive the headrest forward with respect to a vehicle at a collision pre-stage before collision of an object with a back of the vehicle to protect an occupant of the vehicle,
   wherein an electrostatic capacity sensor is arranged in the headrest, and
   wherein the processor is configured to control an amount of forward movement of the headrest during the collision pre-stage according to a change gradient of the electrical capacitance detected by the electrostatic capacity sensor upon forward movement of the headrest.

3. The vehicle occupant protection device as claimed in claim 2, wherein said device is configured to control the amount of the forward movement of the headrest according to the change gradient in the electrical capacitance and a forward moving speed of the headrest, which is determined by an operating speed of the driving mechanism.

4. The vehicle occupant protection device as claimed in claim 2, wherein said device has movement stop means for stopping the forward movement of the headrest if the change gradient of the electrical capacitance exceeds a predetermined threshold.

5. The vehicle occupant protection device as claimed in claim 4, wherein said device is configured to correct at least one of the predetermined threshold and the change gradient of the electrical capacitance according to a forward moving speed of the headrest, which is determined by an operating speed of the driving mechanism.

6. The vehicle occupant protection device as claimed in claim 2, wherein said device is configured to control the amount of the forward movement of the headrest according to the change gradient of the electrical capacitance and at least one of an operating voltage and an operating current of the driving mechanism.

7. The vehicle occupant protection device as claimed in claim 4, wherein the headrest is provided with a touch sensor as another movement stop means for stopping the forward movement of the headrest if contact between the headrest and a head of the occupant is detected by the touch sensor.

8. The vehicle occupant protection device as claimed in claim 2, wherein said device has a voltage control means for controlling at least one of an operating voltage and an operating current of the driving mechanism to be maintained constant.

9. The vehicle occupant protection device as claimed in claim 4, wherein said device is configured to correct at least one of the predetermined threshold and the change gradient in the electrical capacitance according to at least one of an operating voltage and an operating current of the driving mechanism.

10. The vehicle occupant protection device according to claim 2, wherein said device is configured to stop the forward movement of the headrest in a non-contact position with respect to a back of a head of the occupant.

11. The vehicle occupant protection device according to claim 2, wherein the collision pre-stage indicates that a crash cannot be avoided, and wherein the change gradient is derived from a change in a ratio of a detected electrical capacitance and a reference electrical capacitance with respect to a change in time.

* * * * *

UNITED STATES PATENT AND TRADEMARK OFFICE
CERTIFICATE OF CORRECTION

PATENT NO. : 7,853,381 B2  Page 1 of 1
APPLICATION NO. : 11/793236
DATED : December 14, 2010
INVENTOR(S) : Motomi Iyoda It is certified that error appears in the above-identified patent and that said Letters Patent is hereby corrected as shown below:

On the title page, Item (86), the PCT No. is incorrect. Item (86) should read:

-- (86) PCT No.: PCT/JP2006/321419

§371 (c)(1),
(2), (4) Date: Jun. 15, 2007 --

Signed and Sealed this
Eighth Day of March, 2011

David J. Kappos
*Director of the United States Patent and Trademark Office*